United States Patent [19]
Ferrari et al.

[11] Patent Number: 6,074,118
[45] Date of Patent: Jun. 13, 2000

[54] AUTOMATIC DEVICE FOR LOCKING A VEHICLE WHEEL ONTO BALANCING MACHINE SHAFT

[75] Inventors: Gino Ferrari; Franco Maioli, both of Correggio, Italy

[73] Assignee: FEMAS S.R.L., Corregglio, Italy

[21] Appl. No.: 08/909,080

[22] Filed: Aug. 14, 1997

[30] Foreign Application Priority Data

Sep. 6, 1996 [IT] Italy .................................. RE96A0071

[51] Int. Cl.⁷ ........................................................ F16B 9/00
[52] U.S. Cl. ................................ 403/31; 403/37; 73/487; 73/459
[58] Field of Search ................................ 403/31, 34, 37, 403/321, 322.1, 325, DIG. 4; 73/487, 459

[56] References Cited

U.S. PATENT DOCUMENTS

| | | |
|---|---|---|
| 3,877,315 | 4/1975 | Carrigan ................................ 73/487 X |
| 4,031,760 | 6/1977 | Muller ................................... 73/487 X |
| 4,040,300 | 8/1977 | Negard .................................... 73/459 |
| 4,202,213 | 5/1980 | Toriselli ................................... 73/487 |
| 5,664,898 | 9/1997 | Ferrari et al. ............................. 403/37 |
| 5,703,291 | 12/1997 | Rossteuscher ............................ 73/487 |
| 5,777,224 | 7/1998 | Coetsier et al. .......................... 73/487 |

*Primary Examiner*—Lynne H. Browne
*Assistant Examiner*—David E. Bochna

[57] ABSTRACT

A device for automatically locking a wheel onto a front end of a balancing machine shaft includes a hollow profiled body provided with a frontal member on which the rim of the wheel to be balanced bears. The profiled body acts as a housing for a slider positioned coaxial to the shaft and extends beyond the bearing member where it presents a threaded portion arranged to receive a ring nut for locking said wheel rim. The housing is intended to be connected to a pressurized fluid source in such a manner that the slider is able to slide between a withdrawn locking position in which the ring nut urges the wheel rim against the bearing member, and an advanced release position in which the ring nut is disengaged from the wheel rim.

21 Claims, 3 Drawing Sheets

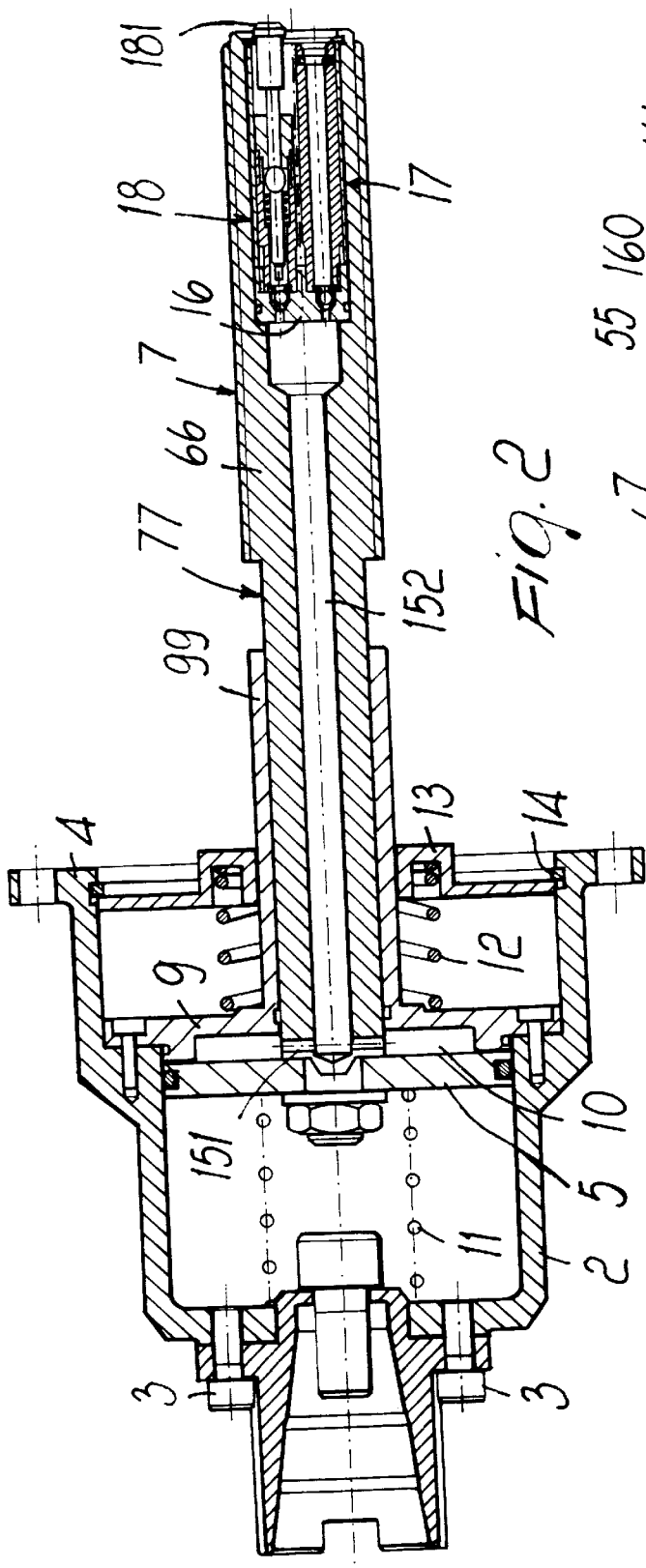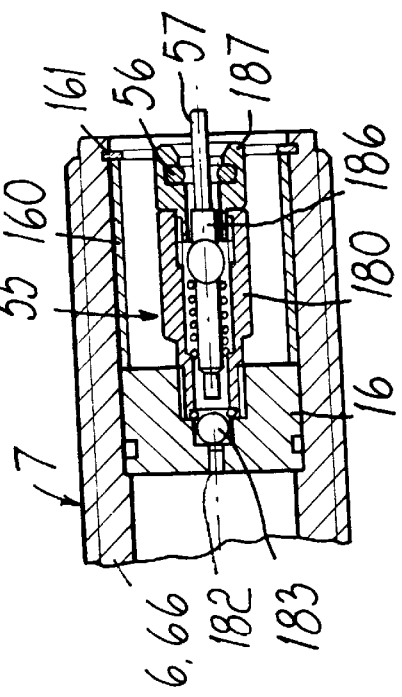
FIG. 2
FIG. 4

AUTOMATIC DEVICE FOR LOCKING A VEHICLE WHEEL ONTO BALANCING MACHINE SHAFT

This invention relates in a totally general manner to balancing machines for motor vehicle wheels in general, and more particularly relates to a device for automatically locking said wheels onto the balancing shaft of such machines.

In a more specific manner the invention relates to a device for locking wheels, the rim of which is centrally holed.

Said balancing machines, which it is not necessary to describe in detail herein, comprise a horizontal rotatable balancing shaft which is usually provided with a removable end spindle forming a prolongation of said shaft and supporting the wheels to be balanced.

According to the known art, to lock the wheel rim said shaft is provided with a counteracting surface against which said wheel rim bears, said spindle being provided with a terminal thread with which a quick-locking ring nut is made to engage.

This latter consists of an annular body having a smooth central hole to be mounted as an exact fit on said terminal thread, and comprising at least one side aperture receiving a slide block provided with a threaded portion. The said annular body is provided with means to cause said block to slide so as to position the threaded portion inside or outside the central hole, and means, such as two diametrically opposite handgrips, by which the ring nut can be tightened.

Between the ring nut and wheel rim there is interposed a centering and locking cone for said wheel rim, the cone being either rigid or not rigid with the ring nut.

A problem arising with the aforesaid locking method is that the operator is required to exert a relatively large force to securely lock the wheel rim against said counteracting surface such that there is no relative rotation between the wheel rim and balancing shaft when this latter is enabled to rotate at the commencement of a balancing operation.

If relative rotation occurs, the machine must be halted, the ring nut further tightened, and the machine restarted, obviously leading to inconvenient tome loss.

As such tightening operations are normally effected many times during a working shift, there is a much felt requirement in this sector for means able to dispense with their need.

In an attempt to satisfy said requirement, it has been proposed in some cases to clamp the wheel rim by means of the respective counteracting surface, which for this purpose is arranged to slide relative to the balancing shaft to occupy a withdrawn or rest position in which it is shifted towards the machine base, and an advanced or working position in which it is shifted towards the ring nut against which it locks the wheel rim.

At least its forward travel is driven by a pressurized fluid medium, for example compressed air.

Apart from its constructional complexity in terms of the sealed connections required for feeding said pressurized fluid, said known solution has proved unsatisfactory because the advancement of said counteracting surface introduces unbalance into the system tending to make the machine readings imprecise or unreliable.

In this respect, the machine is properly calibrated when the counteracting surface is in its withdrawn position, but not when this surface is in its advanced position because of the intrinsic slack and/or tolerance between the relatively slidable members.

The main object of the present invention is to obviate the aforesaid problems within the context of a solution which is simple and rational constructionally, and reliable operationally.

Said object is attained according to the invention by a device comprising, for coaxial fixing onto the front end of the balancing machine balancing shaft, a hollow profiled body provided with a frontal member on which the rim of the wheel to be balanced bears, and acting as a housing for a slider positioned coaxial to said balancing shaft and extending beyond said bearing member where it presents a threaded portion arranged to receive a ring nut for locking said wheel rim, said housing being intended to be connected to a pressurized fluid source in such a manner that said slider is able to slide between a withdrawn locking position in which the ring nut urges the wheel rim against said bearing member, and an advanced release position in which said ring nut is disengaged from the wheel rim.

In particular, said profiled body is shaped in the form of a cup, of which that region in proximity to its base represents said housing, and of which the mouth is provided with an outer perimetral flange representing said wheel rim bearing member.

Moreover, said slider preferably consists of a piston which is sealedly slidable within said housing, and of which the rod comprises said threaded portion.

Said advanced position for releasing the slider is preferably achieved by an elastic member, such as a compressed spring lying between the base of the cup-shaped body and said piston, said withdrawn position being achieved by a pressurized fluid, typically compressed air, flowing along a longitudinal duct extending along the axis of the balancing shaft and opening at one end into the piston operating chamber provided in the front part of the cup-shaped body, and at its other end comprising valve means arranged to permit entry and exit passage of said pressurized fluid.

The piston rod can be hollow or not, so that in the first case it is sealedly slidable on the front end of the balancing shaft, whereas in the second case the rod constitutes the direct prolongation of this latter and is received within an enclosing guide and support body.

In a first embodiment, said valve means comprise two valves provided on the free or front end of the piston rod (whether hollow or not), of which one is used for compressed air feed and the other for its discharge.

Alternatively, compressed air feed and discharge can be provided by a single valve unit.

In a further embodiment, said longitudinal duct comprises a coaxial through hole provided in the balancing shaft, its rear end being connected to the compressed air source via a delivery conduit intercepted by a feed valve, and its front end being connected to the corresponding end of the hollow rod where a central discharge valve is provided.

In a modification to said further embodiment, the front ends of said through hole and of said hollow rod may be closed, and said feed and discharge valves be both associated with the rear end of said through hole.

Again, according to an advantageous characteristic of the invention, with said bearing member there is associated a thrust element which is provided to automatically detach the wheel rim from said bearing member when the ring nut assumes its release position.

The constructional and operational characteristics of the invention will be apparent from the detailed description given hereinafter with reference to the figures of the accompanying drawings, which illustrate some preferred embodiments thereof by way of non-limiting example.

FIG. 2 is a view similar to the preceding showing a second embodiment of the invention.

FIG. 4 shows a modification of the valve means shown in FIG. 3.

It should firstly be noted that the device of the invention is suitable for association with balancing machines of various types, which will not be illustrated or described as these are known to the expert of the specific art.

Figure 1:
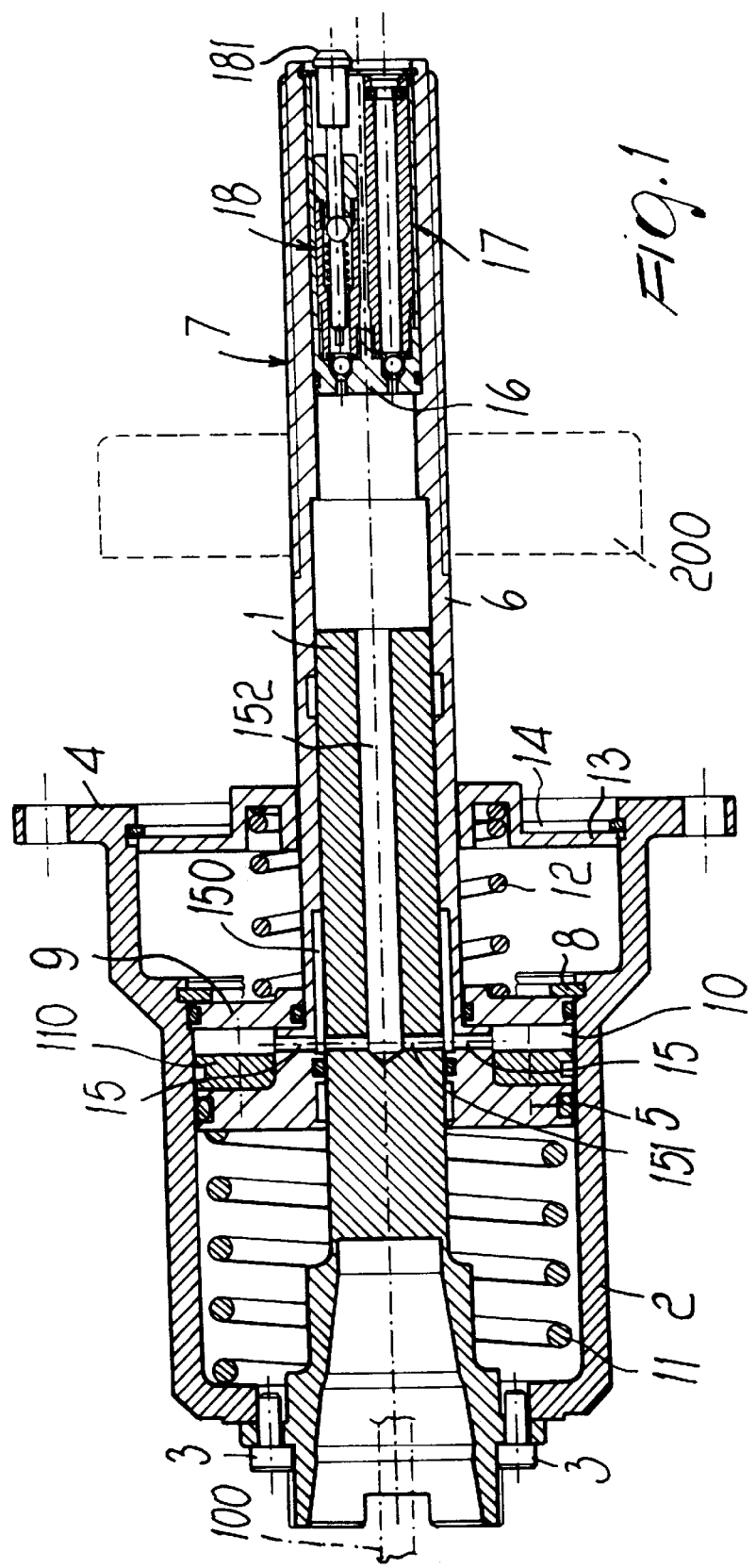
FIG. 1 is a sectional side elevation of a first embodiment of the invention.

With particular reference to FIG. 1, this shows a spindle 1 of different cross-sections which is intended to be secured to the end of the balancing shaft (not shown) of a balancing machine.

On said spindle 1, which forms the direct prolongation of said balancing shaft, there is mounted a body 2 shaped as a cup with a holed base, and having a length less than that of the spindle 1.

Said holed base is fixed to said spindle by the screws indicated by 3, on the mouth of said body 2 there being an outer circumferential flange 4 arranged to provide a bearing for the rim of the wheel to be balanced (not shown).

As can be seen, the internal cavity of the body 2 comprises two regions of different diameter, the region of smaller diameter being at the end comprising said holed base, and that of greater diameter being at the end where said flange 4 is located.

In said first region there is slidingly and sealedly mounted an annular piston 5 provided with a guide ring 110, and from which there extends a hollow rod 6 which is sealedly slidable on the spindle 1, and extends beyond the free or front end of this latter, where it comprises a threaded terminal portion 7.

A quick-locking ring nut, not shown as of usual type, is arranged to engage said threaded portion 7 to lock the wheel rim against the flange 4, via an interposed likewise usual cone, which can either be rigid with said ring nut or not.

Said two inner regions of the body 2 are separated by a centrally holed disc 9 which externally seals against said body 2, and internally seals against the rod 6, and furthermore is axially locked between a shoulder on the body 2 and a snap ring 8.

Between the disc 9 and the piston 5 there is defined an operating chamber 10 which can be connected to a compressed air source as stated hereinafter, a compressed repositioning spring being located between said piston 5 and said holed base of the body 2.

On the opposite side of the disc 9 to that facing the piston 5 there is a compressed repositioning spring 12 which maintains a ring 13 constantly urged elastically towards a respective forward travel stop 14.

By means of a precise free-sliding fit, said ring 13 is slidable within its containing region in the body 2 and on the hollow rod 6. Said ring 13 is provided with a central raised portion the front face of which extends beyond the active face of the flange 4 when the ring 13 rests against said stop 14.

In the illustrated embodiment, the operating chamber 10 is connected to the compressed air source via a series of angularly equidistant radial holes 15 provided in a shoulder of the piston 5 and opening into an annular chamber 150 located between the rod 6 and the spindle 1, and communicating with a coaxial dead hole 152 in said spindle 1 via a series of angularly equidistant radial holes 151.

Figure 3:
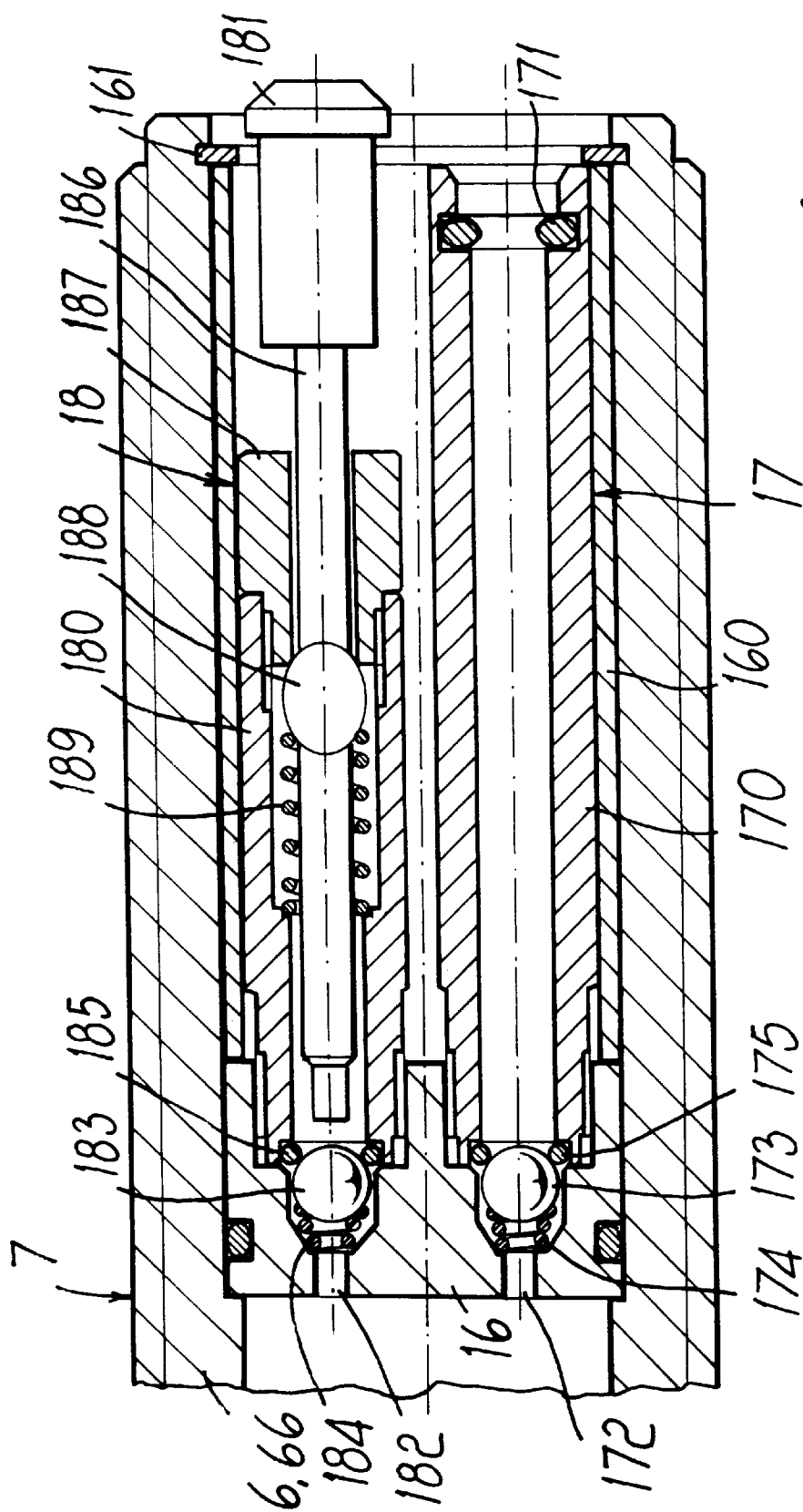
FIG. 3 shows the right terminal part of FIGS. 1 and 2 on an enlarged scale.

At its other end the hole 152 opens into the interior of the rod 6, the free end of which is sealed by a plug 16 locked in position by a spacer 160 and a snap ring 161 (see FIG. 3).

In a modification, the connection between said annular chamber 150 and the front hollow region of the rod 6 can be made by at least two small diametrically opposing longitudinal grooves which can be formed either in the inner surface of the rod 6 or in the outer surface of the spindle 1. Said modification is not illustrated because it is easily implemented by an expert of the art.

As can be seen in FIG. 3, with said plug 16 there are associated a compressed air feed valve 17 and discharge valve 18, which are located on one side and the other of the longitudinal axis of the hollow rod 6.

The feed valve 17 comprises a hollow cylindrical body 170 which is screwed into said plug 16, and at its mouth, which faces the free end of the rod 6, there is provided an internal annular gasket 171 to provide the necessary seal for a compressed air delivery nose such as the shaped end of a usual compressed air gun.

At its opposite end, the passage through said body 170 communicates with a respective through hole 172 in the plug 16 via a ball 173 located between a compressed closure spring 174 and a gasket 175.

In a like manner to the feed valve 17, the discharge valve 18 comprises a hollow cylindrical body 180 screwed into the plug 16, a ball 183 positioned to intercept a through hole 182 in said plug 16, a compressed spring 184 for closing the ball 183, and a gasket 185 forming the seal seat for the ball 183.

This latter is opened by a needle 186 slidingly received, with a certain radial clearance, in the central passage through the body 180 and in a coaxial hole provided in a plug 187 screwed into the outer end of the body 180. The needle 186 is maintained spaced from the ball 183 by a compressed spring 189 which is positioned between an undercut shoulder on the body 180 and a flattened anti-withdrawal portion 188 of said needle and maintains said portion 188 constantly urged elastically against said plug 187.

Finally, said needle 186 extends as far as the free end of the hollow rod 6, where it comprises a push head 181 for manually opening the ball 183.

At this point it should be noted that the component elements of said valves 17 and 18 are sized and shaped to have the same weight, for obvious reasons.

In an alternative embodiment, the annular chamber 150 (see FIG. 1) communicates with a through coaxial hole (not shown) provided in the spindle 1 and connected to a through coaxial hole (shown by dashed and dotted lines and indicated by 100 in the figure) provided in the balancing shaft.

The front end of said through coaxial hole in said shaft is connected, for example by means of a sliding frontal contact with an interposed seal ring, to a pipe connected to a compressed air source.

Said pipe is intercepted by a suitable feed valve, for example remotely operable by a pedal, a discharge valve such as that indicated by 18 being positioned at the centre of the plug 16.

Finally, in a modification, the front ends of the spindle 1 and rod 6 can be dead-ended, and said two feed and discharge valves can be associated with the rear end of the balancing shaft.

Neither said alternative embodiment nor said modification is shown as they are easily understood and implemented by an expert of the art.

With regard to the alternative solution of FIG. 2, this comprises substantially the same elements as the solution of FIG. 1, hence the same reference numerals have been used.

As can be seen, in said alternative solution the previously described spindle 1 is not provided, and the piston 5 is in the form of a discoidal body.

From the piston 5 there extends a rod 66 provided with a coaxial dead hole 152 which at one end communicates with the operating chamber 10 via a series of angularly equidistant radial holes 151, and at the other end is sealed by the plug 16.

This latter is provided with the feed and discharge valves 17 and 18 already described with reference to FIG. 3.

FIG. 2 shows that the rod 66 comprises a smooth cylindrical initial portion 7 and a threaded terminal portion 7. The smooth portion 77 has an outer diameter less than that of the threaded portion 7, with this latter there engaging a usual quick-locking ring nut.

Said smooth portion 77 is slidingly and sealedly received within a tube 99 branching from the holed disc 9. Said tube 99, which passes beyond the ring 13, has an outer diameter practically equal to that of the threaded portion 7, and a length less than that of said smooth portion 77.

Finally, in the modification shown in FIG. 4, the valve means 17 and 18, for compressed air feed and discharge respectively, can be incorporated into a single valve unit, which can be used for both the embodiments of FIGS. 1 and 2.

Said single valve unit, indicated overall by 55 in said FIG. 4, is formed substantially as the discharge valve shown in FIGS. 1 to 3. To perform the double function of compressed air feed and discharge, the plug 187 is positioned in proximity to the free or front end of the rod 6 or 66, where it has a flared mouth arranged to engage a compressed air delivery nosepiece of conjugate shape, and comprises an annular gasket 56 for providing the necessary seal.

In addition, the needle 186 comprises a small terminal stem 57 passing beyond both said body 187 and the free end of the rod 6, 66 to make available a pusher for manually opening the ball valve 183.

The merits and advantages of the invention, and its operation, are clearly apparent from the aforegoing description and from an examination of the accompanying figures.

The invention is not limited to that illustrated and described, but includes all technical equivalents of the stated means, and their combinations, if implemented within the context of the following claims.

What is claimed is:

1. A locking device mountable on a shaft of a wheel balancing machine for locking a wheel on the shaft, the locking device comprising:
    a hollow profiled body having an axial direction of extension and including a first open end constructed and arranged to receive a distal end of the shaft of the wheel balancing machine, and a second open end having laterally extending flanged bearing surface against which the wheel is borne;
    a slider constructed and arranged within said profiled body so as to be selectively moveable along said axial direction of extension, said slider including an elongate portion extending from said second open end of said profiled body, said elongate portion being aligned coaxially with the shaft of the wheel balancing machine and including a threaded distal portion for receiving a cooperatively threaded locking member thereon; and
    a fluidic pressure supply mechanism constructed and arranged to selectively cause said slider to move within said profiled body between an axially retracted position in which the wheel is urged into abutting said bearing surface by said locking member threaded on said elongate portion, and an axially extended position in which said locking member is moved away from the wheel so as to release the wheel from a position abutting said bearing surface, said fluidic pressure supply mechanism comprising a valve assembly constructed and arranged to selectively feed and exhaust fluidic pressure, said valve assembly being provided at a distal end of said elongate portion of said slider.

2. The device according to claim 1, further comprising a disc member arranged to divide an interior of said profiled body into a first region proximal to the wheel balancing machine, and a second region distal to the wheel balancing machine relative to said first region, said disc member including an opening therethrough through which said elongate portion passes.

3. The device according to claim 2, comprising a spring member provided in said first region of said profiled body and constructed and arranged to bias said slider towards said axially extended position.

4. The device according to claim 2, wherein said slider includes a piston member disposed in said first region of said profiled body, such that said elongate portion extends from said piston member through said opening of said disc member, wherein said fluidic pressure supply mechanism includes a fluidic working region defined in said first region by said disc member, said piston member, and an interior of said profiled body, to which fluidic pressure is selectively provided so as to cause said piston member to move.

5. The device according to claim 4, wherein said elongate portion includes a bore formed therealong communicating with said valve assembly.

6. The device according to claim 5, wherein said valve assembly comprises a single feed/exhaust valve constructed and arranged to receive fluidic pressure and exhaust fluidic pressure therefrom.

7. The device according to claim 6, wherein said feed/exhaust valve comprises;
    a ball valve member sealingly urged against a valve seat by at least one of a resilient member and fluidic pressure within said elongate member; and
    a push rod resiliently biased away from said ball valve member and actuable to push said ball valve member away from said valve seat, thereby allowing fluidic pressure to be fed into said elongate portion or allowing fluidic pressure with said elongate portion to be exhausted therefrom.

8. The device according to claim 5, wherein said slider is adapted to slide telescopingly over the distal end of the shaft of the wheel balancing machine, wherein the shaft includes an axial shaft bore formed therealong, a first end of the shaft bore terminating at the distal end of the shaft so as to communicate with said bore formed in said elongate portion, a second end of the shaft bore communicating with at least one laterally extending secondary bore so as to communicate the shaft bore with said fluidic working region.

9. The device according to claim 5, wherein said bore formed in said elongate portion communicates with at least one laterally extending secondary bore formed in said elongate portion, said at least one secondary bore communicating said bore formed in said elongate portion with said fluidic working region.

10. The device according to claim 9, wherein said disc member includes an axially extending sleeve through which said elongate portion is slidably supported.

11. The device according to claim 5, wherein said valve assembly comprises a feed valve and an exhaust valve.

12. The device according to claim 11, wherein said exhaust valve comprises:
    a ball valve member sealingly urged against a valve seat by a resilient member; and
    a release member constructed and arranged to selectively press said ball valve member against said resilient member and away from said valve seat to allow fluidic pressure exhaust.

13. The device according to claim 12, wherein said release member comprises a resiliently-biased push rod biased in a direction away from said ball valve member.

14. The device according to claim 11, wherein said feed valve comprises a ball valve member sealingly urged against a valve seat by a resilient member, said resilient member being constructed and arranged to yield under the pressure of an input fluid so as to allow said ball valve member to move off of said valve seat.

15. The device according to claim 2, further comprising an axially movable thrust member arranged to close off said second open end of said profiled body, said thrust member having an opening formed there through which said elongate portion passes.

16. The device according to claim 15, further comprising a spring member constructed and arranged to bias said thrust member towards said distal end of said elongate portion, said thrust member including an outwardly projecting region constructed and arranged to resiliently urge the wheel away from said bearing surface.

17. An apparatus for balancing a vehicle wheel comprising:
- a rotatable shaft for rotating the wheel during balancing; and
- a locking device fixed on a distal end of said shaft for locking the wheel relative to said shaft, said locking device comprising:
  - a hollow profiled body having an axial direction of extension and including a first open end constructed and arranged to receive a distal end of the shaft of the wheel balancing machine, and a second open end having laterally extending flanged bearing surface against which the wheel is borne;
  - a slider constructed and arranged within said profiled body so as to be selectively moveable along said axial direction of extension, said slider including an elongate portion extending from said second open end of said profiled body, said elongate portion being aligned coaxially with the shaft of the wheel balancing machine and including a threaded distal portion for receiving a cooperatively threaded locking member thereon; and
  - a fluidic pressure supply mechanism constructed and arranged to selectively cause said slider to move within said profiled body between an axially retracted position in which the wheel is urged into abutting said bearing surface by said locking member threaded on said elongate portion, and an axially extended position in which said locking member is moved away from the wheel so as to release the wheel from a position abutting said bearing surface, said fluidic pressure supply mechanism comprising a valve assembly constructed and arranged to selectively feed and exhaust fluidic pressure, said valve assembly being provided at a distal end of said elongate portion of said slider.

18. A locking device mountable on a shaft of a wheel balancing machine for locking a wheel on the shaft, the locking device comprising:
- a hollow profiled body having an axial direction of extension and including a first open end constructed and arranged to receive a distal end of the shaft of the wheel balancing machine, and a second open end having laterally extending flanged bearing surface against which the wheel is borne;
- a slider constructed and arranged within said profiled body so as to be selectively moveable along said axial direction of extension, said slider including an elongate portion extending from said second open end of said profiled body, said elongate portion being aligned coaxially with the shaft of the wheel balancing machine and including a threaded distal portion for receiving a cooperatively threaded locking member thereon; and
- a fluidic pressure supply mechanism constructed and arranged inside said hollow profiled body to selectively cause said slider to move within said profiled body between an axially retracted position in which the wheel is urged into abutting said bearing surface by said locking member threaded on said elongate portion, and an axially extended position in which said locking member is moved away from the wheel so as to release the wheel from a position abutting said bearing surface.

19. The device according to claim 18, further comprising a disc member arranged to divide an interior of said profiled body into a first region proximal to the wheel balancing machine, and a second region distal to the wheel balancing machine relative to said first region, said disc member including an opening therethrough through which said elongate portion passes.

20. The device according to claim 19, comprising a spring member provided in said first region of said profiled body and constructed and arranged to bias said slider towards said axially extended position.

21. The device according to claim 19, wherein said slider includes a piston member disposed in said first region of said profiled body, such that said elongate portion extends from said piston member through said opening of said disc member, wherein said fluidic pressure supply mechanism includes a fluidic working region defined in said first region by said disc member, said piston member, and an interior of said profiled body, to which fluidic pressure is selectively provided so as to cause said piston member to move.

* * * * *